(12) United States Patent
Yatabe et al.

(10) Patent No.: US 7,609,011 B2
(45) Date of Patent: Oct. 27, 2009

(54) ELECTRIC FORCE TRANSMISSION DEVICE

(75) Inventors: Kazuo Yatabe, Kanagawa (JP);
Yuusuke Minagawa, Kanagawa (JP);
Tomoya Imazu, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 304 days.

(21) Appl. No.: 11/659,073

(22) PCT Filed: Aug. 2, 2005

(86) PCT No.: PCT/JP2005/014078

§ 371 (c)(1),
(2), (4) Date: Feb. 1, 2007

(87) PCT Pub. No.: WO2006/013840

PCT Pub. Date: Feb. 9, 2006

(65) Prior Publication Data

US 2008/0297073 A1    Dec. 4, 2008

(30) Foreign Application Priority Data

Aug. 2, 2004    (JP) .............................. 2004-225461

(51) Int. Cl.
*H02P 5/00*    (2006.01)
(52) U.S. Cl. .......................... 318/140; 318/149; 475/1; 475/5; 180/65.2

(58) Field of Classification Search ......... 318/140–149; 475/5, 10, 149; 477/4; 310/11, 58, 259; 322/34
See application file for complete search history.

(56) References Cited

U.S. PATENT DOCUMENTS

| | | | |
|---|---|---|---|
| 6,819,985 B2 | 11/2004 | Minagawa et al. | |
| 6,852,053 B2 * | 2/2005 | Nakano et al. | 475/5 |
| 6,887,175 B2 * | 5/2005 | Yamauchi et al. | 475/10 |
| 7,063,637 B2 | 6/2006 | Yamauchi et al. | |
| 7,282,008 B2 * | 10/2007 | Oshidari | 477/4 |
| 7,291,080 B2 * | 11/2007 | Minagawa et al. | 475/5 |
| 7,306,064 B2 * | 12/2007 | Imazu et al. | 180/65.2 |

(Continued)

FOREIGN PATENT DOCUMENTS

JP    2000-102108 A    4/2000

(Continued)

*Primary Examiner*—Paul Ip
(74) *Attorney, Agent, or Firm*—Foley & Lardner LLP (57) ABSTRACT

In an electric force transmission device employing two motor generators and a differential device having at least three rotating members and having two degrees of freedom, the first rotating member is coupled to the first motor generator, the second rotating member is coupled to the second motor generator, and the third rotating member is coupled to an output shaft and laid out to be located between the first and the second rotating members on an aligmnent chart. Also, a controller is configured to control the motor generators such that, when the output shaft is driven from its stopped state, before the driving is started, the first and second motor generators are rotated oppositely to each other, while keeping a rotational speed of the output shaft at the stopped state.

10 Claims, 7 Drawing Sheets

U.S. PATENT DOCUMENTS

| | | | |
|---|---|---|---|
| 2003/0064847 A1* | 4/2003 | Oshidari et al. | 475/5 |
| 2003/0069104 A1* | 4/2003 | Nakano et al. | 475/5 |
| 2003/0073534 A1* | 4/2003 | Oshidari et al. | 475/5 |
| 2003/0162617 A1* | 8/2003 | Minagawa et al. | 475/5 |
| 2003/0173934 A1* | 9/2003 | Arimitsu | 322/34 |
| 2003/0181276 A1* | 9/2003 | Minagawa et al. | 475/5 |
| 2003/0224892 A1* | 12/2003 | Yamauchi et al. | 475/5 |
| 2003/0232678 A1* | 12/2003 | Yamauchi et al. | 475/5 |
| 2004/0060774 A1* | 4/2004 | Oshidari et al. | 184/6.12 |
| 2004/0082419 A1* | 4/2004 | Randall | 475/149 |
| 2004/0084233 A1 | 5/2004 | Wakuta et al. | |
| 2004/0084234 A1* | 5/2004 | Yatabe et al. | 180/65.2 |
| 2004/0110592 A1* | 6/2004 | Yamauchi et al. | 475/5 |
| 2004/0145246 A1* | 7/2004 | Nakano et al. | 310/11 |
| 2004/0145252 A1* | 7/2004 | Arimitsu et al. | 310/58 |
| 2004/0149501 A1* | 8/2004 | Imazu et al. | 180/65.2 |
| 2004/0195929 A1* | 10/2004 | Oshidari et al. | 310/259 |
| 2004/0198551 A1* | 10/2004 | Joe et al. | 477/3 |
| 2004/0232779 A1* | 11/2004 | Arimitsu et al. | 310/43 |
| 2004/0256165 A1* | 12/2004 | Tomita et al. | 180/65.2 |
| 2005/0052091 A1* | 3/2005 | Arimitsu et al. | 310/266 |
| 2005/0077802 A1* | 4/2005 | Toujima et al. | 310/266 |
| 2005/0178593 A1* | 8/2005 | Oshidari | 180/65.2 |
| 2005/0202929 A1* | 9/2005 | Tsuneyoshi et al. | 477/5 |
| 2005/0233851 A1* | 10/2005 | Minagawa et al. | 475/5 |
| 2006/0009884 A1* | 1/2006 | Mensler et al. | 701/1 |
| 2006/0175102 A1* | 8/2006 | Imazu | 180/65.2 |
| 2006/0213320 A1* | 9/2006 | Menjak et al. | 74/640 |
| 2006/0247081 A1* | 11/2006 | Yamauchi et al. | 475/1 |
| 2006/0264296 A1* | 11/2006 | Moeller | 475/275 |

FOREIGN PATENT DOCUMENTS

| | | |
|---|---|---|
| JP | 2001-190006 A | 7/2001 |
| JP | 2003-269596 A | 9/2003 |
| JP | 2004-066898 A | 3/2004 |
| JP | 2004-068852 A | 3/2004 |
| JP | 2004-159393 A | 6/2004 |
| JP | 2004-183801 A | 7/2004 |

* cited by examiner

ELECTRIC FORCE TRANSMISSION DEVICE

TECHNICAL FIELD

The present invention relates to an electric force transmission device, which is capable of driving an output system by only a power from two motor generators and which is useful for a hybrid transmission to have it built-in.

BACKGROUND ART

An electric force transmission device suitable for a hybrid vehicle employing an engine and a motor both serving as a driving power source and described in the following patent publication designated by "Document 1", is generally known as a conventional electric force transmission device.

That is, this type of electric force transmission device is designed to command an electric force needed to merely achieve a required driving force to a motor without fully taking account of a state of a circuit provided to control the driving of the motor.

Document 1: Japanese Patent Provisional Publication No. 2000-102108

SUMMARY OF THE INVENTION

However, in the electric force transmission device disclosed in this document, the state of the circuit, provided to control the driving of the motor, is not taken into account. When electric force transmission is started (or during a starting period in case of on-vehicle electric force transmission device) from an output rotational speed of zero, there is a necessity of a torque rise from the state of the output rotational speed of zero. Larger torque is required, as compared to the electric force transmission under a condition where a certain output rotational speed has already been reached. Thus, there are some problems as described hereunder.

That is, the electric force transmission is started from the output rotational speed of zero, and therefore at the initial stage of the force transmission a component of direct current flows through the motor in a lock state where the motor does not yet rotate or the motor begins to rotate slowly. Thus, there is an increased tendency for the component of direct current to flow through a biased phase of phases of the motor.

Such a tendency becomes more remarkable, as the magnitude of transmitted torque increases. This is because the greater the transmitted torque, the greater the current value of direct current.

As a result of this, the heating value of a particular part of the motor-drive control circuit provided to control the driving of the motor, through which an electric current flows biasedly, tends to become large. Owing to the generated heat, a limitation on an electric current applied to the motor is made, and thus it is impossible to provide an adequate electric force, thereby resulting in a lack of output torque.

The present invention is premised on an electric force transmission device capable of driving an output system by an electric force from two motor generators. It is, therefore, an object of the invention to provide or propose an electric force transmission device capable of avoiding the previously-described disadvantages of the prior art, by dispersing a load into the motor-drive control circuits of these motor generators, during electric force transmission from the state of an output rotational speed of zero, during which the previously-discussed disadvantages may occur.

According to the present invention, an electric force transmission device comprises a differential device having three or more rotating members and having two degrees of freedom. An output to a drive system is transmitted or connected to the rotating member located on an inside on an alignment chart among these rotating members. Two motor generators are coupled to the rotating members located on both sides of the rotating member related to the output on the alignment chart, so that the drive system can be driven by only a power from the motor generators. The electric force transmission device is characterized in that when the driving achieved by only the power from the motor generators is equivalent to driving started from a state of an output rotational speed of zero, before the driving is started, the two motor generators are rotated oppositely to each other, while keeping the state of the output rotational speed of zero.

BRIEF DESCRIPTION OF THE DRAWINGS

FIGS. 5a-5c, which are collectively referred to as FIG. 5, are alignment charts used to explain the operation of the control program of FIG. 4.

FIGS. 7a-7d, which are collectively referred to as FIG. 7, are alignment charts used to explain the operation of the control program of FIG. 6.

DETAILED DESCRIPTION

According to the electric force transmission device of the invention of the present application, when the driving achieved by only a power from two motor generators is equivalent to driving started from a state of an output rotational speed of zero, the two motor generators are rotated oppositely to each other, while keeping the state of the output rotational speed of zero. Therefore, when a driving force command is generated or issued and then the corresponding motor generator torques are generated, these motor generators are rotated oppositely to each other. That is, there is no risk that an electric current flows through a biased phase of phases of each of the motor generators, and thus it is possible to avoid the problem that the electric current flows biasedly through a particular part of the motor-drive control circuit provided to control the driving of each of the motor generators and as a result the heating value of the particular part becomes large. Additionally, it is possible to avoid the problem of a lack of output torque occurring owing to a limitation on the applied electric current to each of the motor generators.

Each of the embodiments of the electric force transmission device of the present invention will be hereinafter described in detail in reference to the drawings.

A drive system of a vehicle is constructed by a hybrid transmission 1 including two motor generators MG1 and MG2, an engine 2 of the input side of hybrid transmission 1, an engine clutch E/C interleaved between hybrid transmission 1 and engine 2, a differential gear mechanism 3 of the output side of hybrid transmission 1 for dividing an output from hybrid transmission 1 into two components, and left and right drive wheels 4L and 4R to which the two components (two output components) divided by differential gear mechanism 3 are transmitted.

Figure 1:
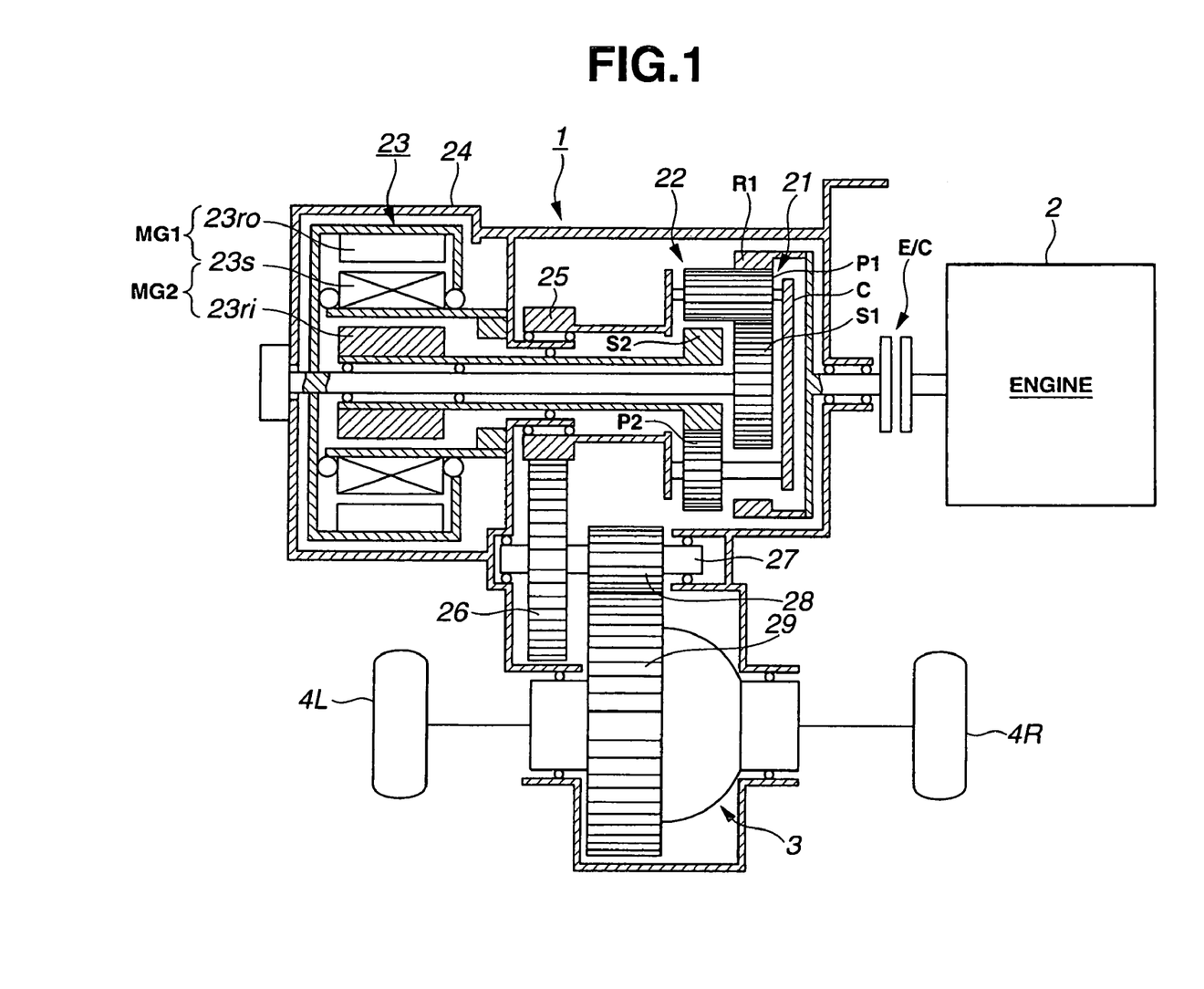
FIG. 1 is a longitudinal cross-sectional view showing a hybrid transmission employing an electric force transmission device of one embodiment, made according to the invention.

Hybrid transmission 1 has a construction as shown in FIG. 1, which is useful as a transaxle for the use of a front-engine front-wheel-drive vehicle (a FF vehicle), and involves therein differential gear mechanism 3.

As can be seen from the detailed cross section of FIG. 1, hybrid transmission 1 employs two single planetary gear sets (differential devices) 21 and 22 coaxially aligned with each other and arranged in the axial direction (the left-to-right direction in the drawing).

Planetary gear set 21, located closer to engine 2, is comprised of a ring gear R1, a sun gear S1, and a pinion P1, which is in meshed-engagement with these gears.

On the other hand, planetary gear set 22, spaced apart from engine 2, is comprised of the ring gear R1, a sun gear S2, and a pinion P2, which is in meshed-engagement with these gears.

Pinion P1 of planetary gear set 21 is formed as a long pinion extending toward planetary gear set 22. Pinion P2 of planetary gear set 22 is formed as a large-diameter short pinion. Small-diameter long pinion P1 is in meshed-engagement with large-diameter short pinion P2. These pinions P1 and P2 are rotatably supported on a common carrier C. That is, planetary gear sets 21 and 22 construct a so-called Ravigneaux planetary gear set.

The Ravigneaux planetary gear set corresponds to a differential device of the present invention. In the shown embodiment, the differential device includes four rotating members. However, in the case of a non-engine equipped vehicle, the differential device may be constructed only by three rotating members.

A compound current two-phase motor 23 is installed far away from engine 2 in such a manner as to be sandwiched between the engine and the Ravigneaux planetary gear set. The motor is accommodated in a transmission case 24 together with the Ravigneaux planetary gear set.

Compound current two-phase motor 23 is comprised of an inner rotor 23ri and an annular outer rotor 23ro surrounding the inner rotor, such that these rotors are coaxially arranged with each other and rotatably supported in transmission case 24. An annular stator 23s is coaxially disposed in an annular space defined between inner rotor 23ri and outer rotor 23ro. The annular stator is fixedly connected to transmission case 24.

Compound current two-phase motor 23 is designed to construct a first motor generator MG1 by outer rotor 23ro and annular stator 23s and also to construct a second motor generator MG2 by annular stator 23s and inner rotor 23ri.

The first motor generator MG1 (outer rotor 23ro) is connected to sun gear S1 (corresponding to the first rotating member) of the Ravigneaux planetary gear set. The second motor generator MG2 (inner rotor 23ri) is connected to sun gear S2 (corresponding to the second rotating member) of the Ravigneaux planetary gear set.

Ring gear R1 (corresponding to the fourth rotating member) serves as an input element and is connectable via engine clutch E/C to engine 2.

Carrier C (corresponding to the third rotating member) serves as an output element. An output gear 25 is coaxially arranged with and integrally connected to the carrier. A counter gear 26 is in meshed-engagement with output gear 25. Counter gear 26 is fixedly connected to a counter shaft 27. A final-drive pinion 28 is further connected to counter shaft 27. Final-drive pinion 28 is in meshed-engagement with a final-drive ring gear 29 connected to differential gear mechanism 3.

Figure 2:
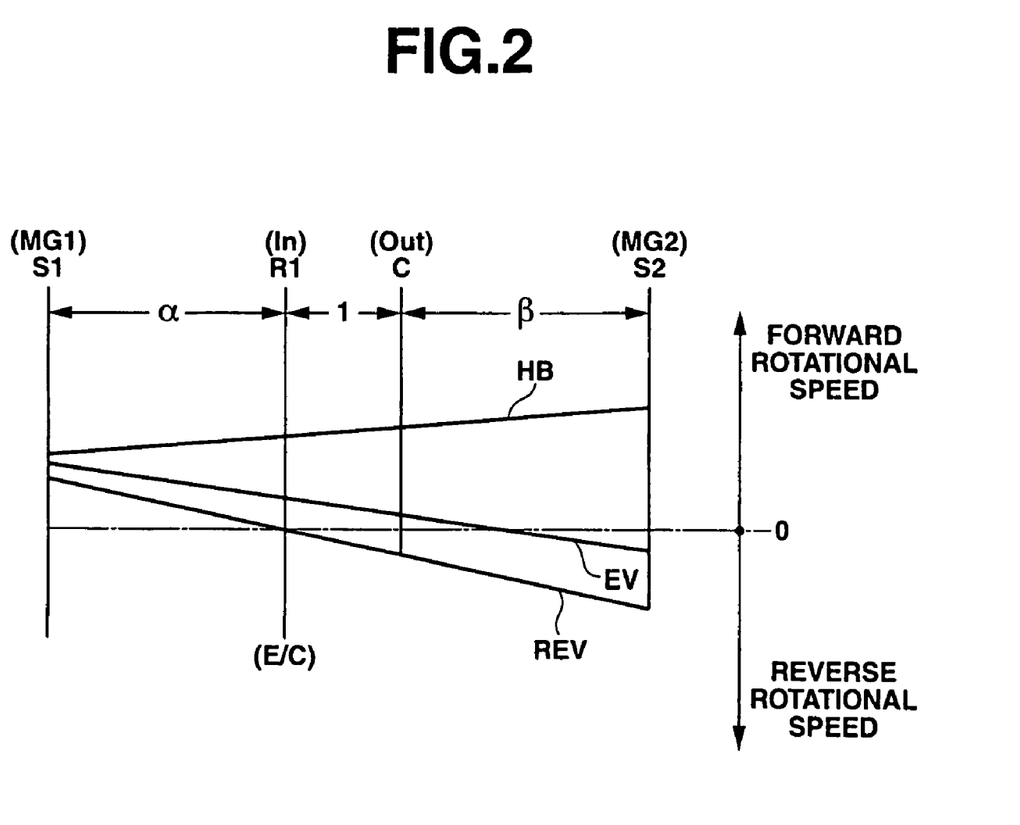
FIG. 2 is an alignment chart of the hybrid transmission shown in FIG. 1.

Hybrid transmission 1 discussed above in reference to FIG. 1 can be represented by an alignment chart of FIG. 2. In the alignment chart, symbol In denotes an input from engine 2, a symbol Out denotes an output to drive wheels 4L and 4R, each of symbols $\alpha$ and $\beta$ means a ratio of distances between the rotating members, determined by a ratio of the number of teeth of planetary gear set 21 and the number of teeth of planetary gear set 22.

A lever HB of FIG. 2 shows a state of the lever during a hybrid running mode in which power from engine 2 is input into ring gear R1 with engine clutch E/C engaged, power from motor generator MG1 is input into sun gear S1 and power from motor generator MG2 is input into sun gear S2, and thus the power from engine 2 and the summed power from both of motor generators MG1-MG2 are directed to the output Out in the drive system so as to generate or extract a normal rotation from the output Out. During the hybrid running mode, it is possible to steplessly vary the transmission ratio by way of motor generator control for motor generators MG1-MG2.

A lever EV of FIG. 2 shows a state of the lever during an electrical vehicle (EV) running mode in which engine 2 is uncoupled from hybrid transmission 1 with engine clutch E/C disengaged, only the power from motor generators MG1 and MG2 are directed through sun gears S1 and S2 of planetary gear sets 21 and 22 to the output Out in the drive system so as to generate or extract a normal rotation from the output Out. During the EV running mode as well as during the hybrid running mode, it is possible to steplessly vary the transmission ratio by way of motor generator control for motor generators MG1-MG2.

Furthermore, a lever REV of FIG. 2 shows a state of the lever during a reverse running mode in which engine 2 is uncoupled from hybrid transmission 1 with engine clutch E/C disengaged, motor generator MG1 is driven in its normal-rotational direction and simultaneously motor generator MG2 is driven in its reverse-rotational direction, while keeping the rotational speed of ring gear R1 coupled to engine 2 at "0" as indicated by the lever REV in FIG. 2, so as to generate or extract a reverse rotation from the output Out, by using only the motor generators MG1 and MG2 as a power source.

Figure 3:
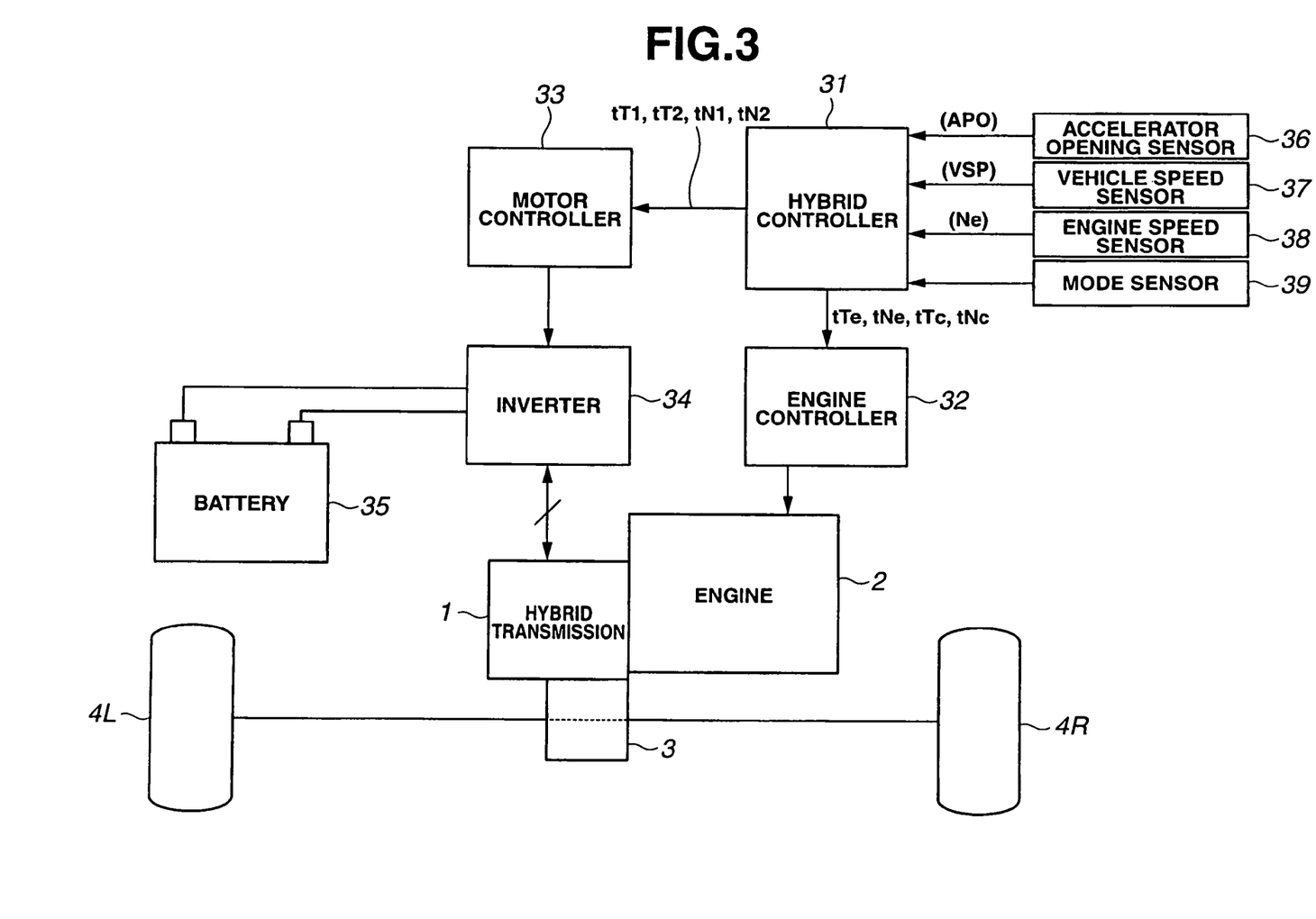
FIG. 3 is a control system diagram of the hybrid transmission shown in FIG. 1.

The above-mentioned control for hybrid transmission 1 and the above-mentioned control for engine 2 (containing engine clutch E/C) are executed by a control system shown in FIG. 3.

Reference sign 31 denotes a hybrid controller capable of executing integrated control for the hybrid transmission as well as engine 2. Hybrid controller 31 generates or supplies commands regarding a target torque tTe and a target speed tNe of engine 2 and commands regarding a target torque tTc and a target speed tNc of engine clutch E/C to an engine controller 32.

Engine controller 32 controls operating conditions of engine 2 so that the target values tTe and tNe are both achieved, and also controls the engagement force of engine clutch E/C so that target torque tTc and target speed tNc are both achieved.

Hybrid controller 31 is further designed to generate or supply command signals regarding a target torque tT1 and a target speed tN1 of motor generator MG1 and a target torque tT2 and a target speed tN2 of motor generator MG2 to a motor controller 33.

Motor controller 33 controls each of motor generators MG1-MG2 by means of an inverter 34 and a battery 35, so that target torques tT1 and tT2 and target speeds tN1 and tN2 are all achieved.

The present invention relates to a technique of power transmission of motor generators (MG1, MG2) during the electrical vehicle (EV) running mode as exemplified by the lever EV in FIG. 2. Specifically, the key point of the invention is to prevent an electric current from flowing biasedly through a particular part of a motor-drive control circuit provided to control the driving of each of the motor generators, and thus to avoid an inadequate electric force occurring due to a limitation on an electric current applied to each of the motor generators, arising from the generated heat, when electric force transmission is started so as to initiate the EV running mode by way of electric forces produced by motor generators MG1-MG2 from the state (the standstill state or the stopped state) of the rotational speed of the output Out of zero.

In the system of the shown embodiment, in order to execute the ordinary control as well as the control that the present invention assumes an aim, hybrid controller 31 receives a signal from an accelerator opening sensor 36 that detects an accelerator opening APO in terms of an accelerator-pedal depression amount, a signal from a vehicle speed sensor 37 that detects vehicle speed VSP (proportional to an output rotational speed No), a signal from an engine speed sensor 38 that detects engine speed Ne, and a signal from a mode sensor 39 that detects a selected shift mode.

Figure 4:
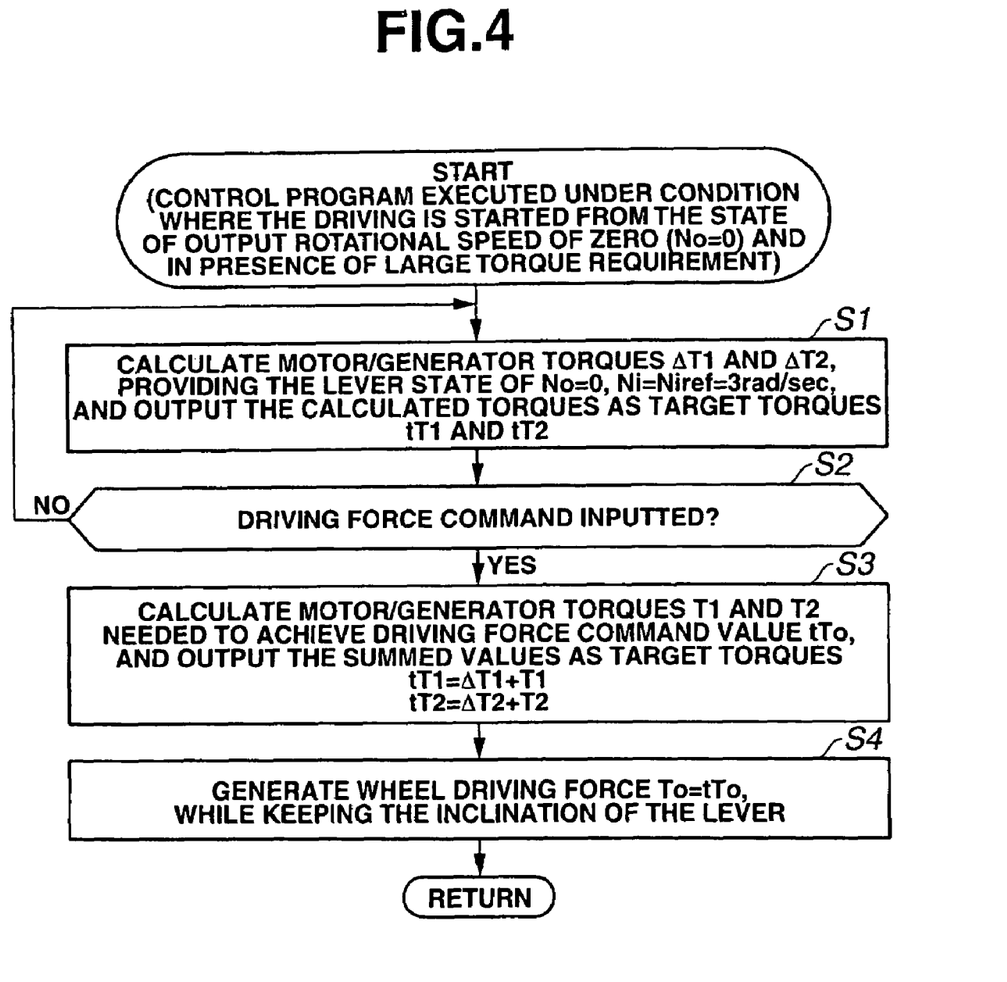
FIG. 4 is a flow chart showing a starting period control program executed during a starting period under a condition where a hybrid controller of the control system requires a large amount of torque.

Hybrid controller 31 executes the control program shown in FIG. 4 on the basis of input information from these sensors, when the driving or propelling is started from the state of the output rotational speed of zero (the state of No=0 is determined based on the signal from sensor 37), and additionally the selected range mode (the selected range mode is determined based on the signal from sensor 39) corresponds to a sporty mode at which there is an increased tendency for a low-speed side transmission ratio to be selected or the vehicle is conditioned in a state where a state of charge SOC (an electric power that can be carried out or delivered) of battery 35 is high and thus a large torque is required.

Figure 6:
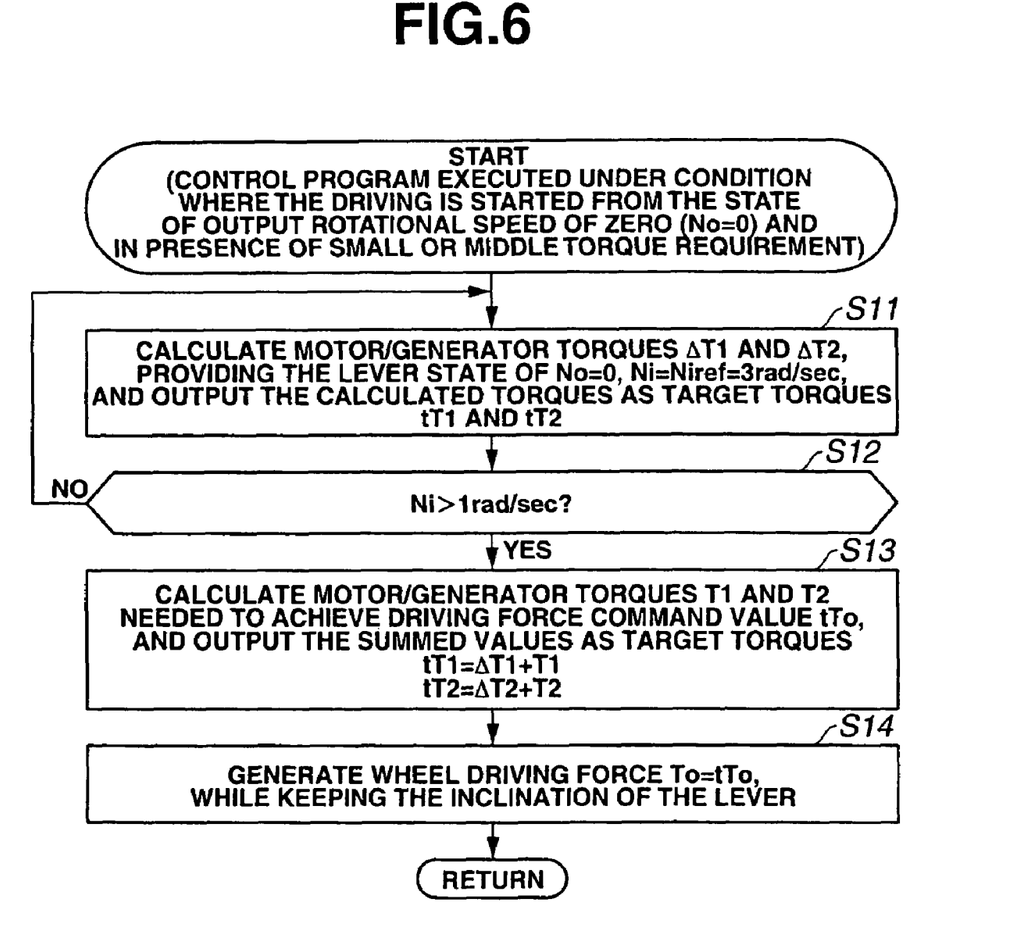
FIG. 6 is a flow chart showing a starting period control program executed during a starting period under a condition where a hybrid controller of the control system requires a small or middle amount of torque.

In contrast, when the driving or propelling is started from the state of the output rotational speed of zero (the state of No=0 is determined based on the signal from sensor 37), and additionally the selected range mode (the selected range mode is determined based on the signal from sensor 39) corresponds to an economy mode (a normal shift mode) at which there is an increased tendency for a high-speed side transmission ratio to be selected and thus a small or middle torque is required, the hybrid controller executes the control program shown in FIG. 6 on the basis of input information from these sensors.

First, the control program of FIG. 4 is explained hereunder. This control program is executed under a condition where the driving is started from the state of the output rotational speed of zero (i.e., No=0), and additionally a large amount of torque is required.

At step S1, the following processing is repeatedly executed for a time period during which it is determined based on accelerator opening APO through step S2 that there is no driving force command input.

Figure 5A:
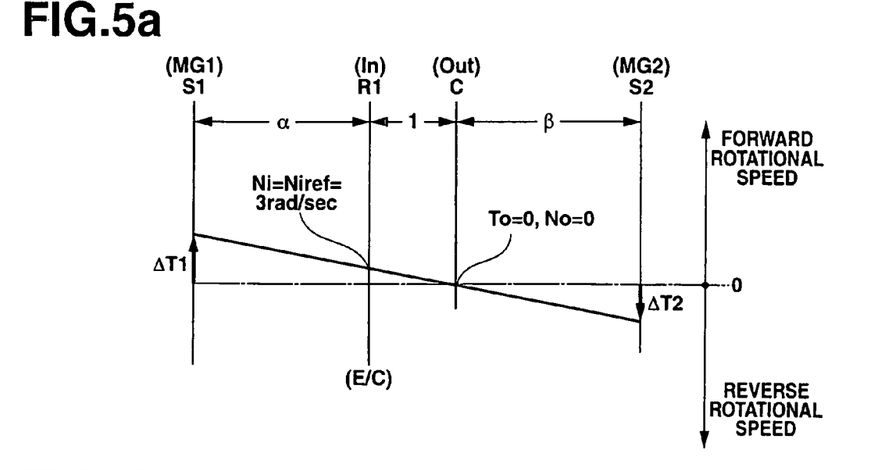
FIG. 5a is the alignment chart showing the lever state before a command regarding a driving force is input.

That is, as shown in FIG. 5a, calculated are lever correction torques $\Delta T1$ and $\Delta T2$ for motor generators MG1 and MG2, needed to provide a lever state that a rotational speed Ni of ring gear R1 serving as the input element has been adjusted to a predetermined normal-rotational speed Niref (e.g., 3 rad/sec in the shown embodiment), while keeping a standstill state of the output rotational speed of zero (i.e., No=0) and the output torque of zero (i.e., To=0).

The reason for keeping rotational speed Ni of ring gear R1 at predetermined normal-rotational speed Niref is that, in the system configuration of the embodiment, the state where rotational speed Ni is predetermined normal-rotational speed Niref (e.g., 3 rad/sec) and additionally the output rotational speed No is equal to zero (No=0) corresponds to a particular state where motor generators MG1-MG2 can output motor torques rapidly, while enabling the most efficient rotational speed relationship. That is, predetermined normal-rotational speed Niref is different depending on the motor performance and the gear ratio. However, there is an innumerable combination of operating points of two motor generators MG1-MG2, satisfying the state of the output rotational speed of zero (No=0), and thus it is desirable to set the target speeds like this embodiment.

In calculating the above-mentioned lever correction torques $\Delta T1$ and $\Delta T2$, a lever correction torque $\Delta T$iref on ring gear R1, needed to bring the lever to the inclined state shown in FIG. 5a, is first calculated based on the actual rotational speed Ni and predetermined rotational speed Niref (e.g., 3 rad/sec). Second, this lever correction torque $\Delta T$iref is converted into lever correction torques $\Delta T1$ and $\Delta T2$ on motor generators MG1-MG2 by way of the following gear ratio ($\alpha$, $\beta$) conversion.

$$\Delta T1 = (\alpha+1) \cdot J1 \cdot \Delta Tiref$$

$$\Delta T2 = -\beta \cdot J2 \cdot \Delta Tiref$$

where J1 denotes a rotational inertia including motor generator MG1, and J2 denotes a rotational inertia including motor generator MG2.

Then, these lever correction torques $\Delta T1$ and $\Delta T2$ are output to motor controller 33 (see FIG. 3) as target torques tT1 and tT2 for motor generators MG1-MG2.

Step S2 determines based on accelerator opening APO that any driving force command has not yet been input, unless the driving force command is output due to an increase in accelerator opening APO from its lowest opening, caused by the driver's accelerator-pedal depression. In such a case, the routine returns to step S1, and the lever state shown in FIG. 5a is maintained.

Thus, the output rotational speed remains kept zero (i.e., No=0) and the output torque remains kept zero (i.e., To=0), and therefore the vehicle is kept in the standstill state.

When the driver depresses or pushes down the accelerator pedal for starting the vehicle and thus driving force command is generated or issued due to an increase in accelerator opening APO from the lowest opening, the control routine proceeds from step S2 to step S3, at which driving force command achievement torques T1 and T2 for motor generators MG1-MG2, needed to achieve a target torque tTo (a driving force command value) on the output Out, which target torque is determined based on accelerator opening APO and vehicle speed VSP, are calculated from the following gear ratio ($\alpha$, $\beta$) conversion.

$$T1=[\beta/(\alpha+\beta+1)] \cdot tTo$$

$$T2=[(\alpha+1)/(\alpha+\beta+1)] \cdot tTo$$

As seen from the following expressions, the summed value of driving force command achievement torque T1 and the previously-noted lever correction torque $\Delta T1$ is set as target torque tT1 of motor generator MG1, whereas the summed value of driving force command achievement torque T2 and the previously-noted lever correction torque $\Delta T2$ is set as target torque tT2 of motor generator MG2. These target torques, i.e., the summed values, are output into motor controller 33 (see FIG. 3).

$$tT1=\Delta T1+T1$$

$$tT2=\Delta T2+T2$$

Figure 5B:
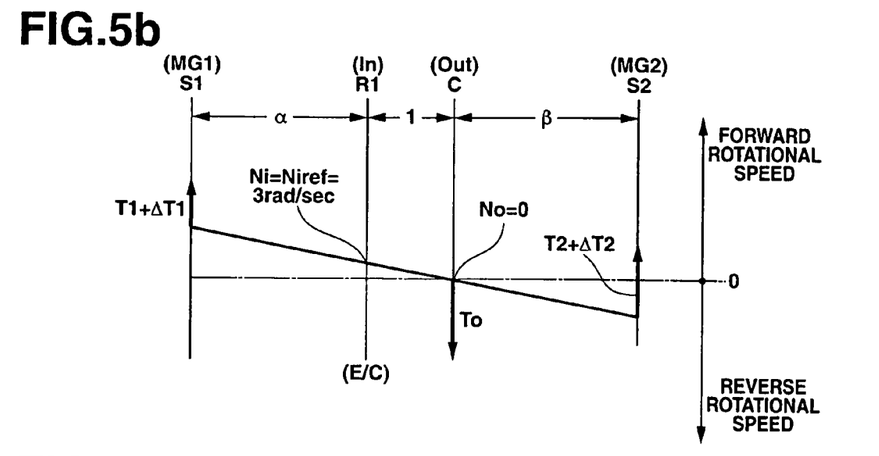
FIG. 5b is the alignment chart showing the lever state just after the driving force command has been input.

Thus, as shown in FIG. 5b, for the same lever as shown in FIG. 5a, regarding both ends of the lever (that is, on motor generators MG1-MG2), the action of torques $\Delta T1$ and $\Delta T2$ shown in FIG. 5a is replaced by the action of torques $\Delta T1+T1$ and $\Delta T2+T2$ on the motor generators. Therefore, output torque To corresponding to target torque tTo is generated.

Figure 5C:
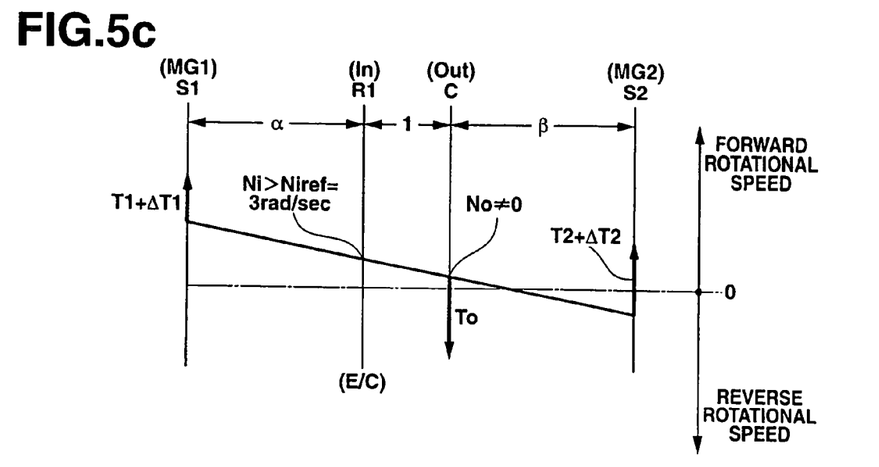
FIG. 5c is the alignment chart showing the lever state after started with the driving force command input.

As a result of this, at step S4, as shown in FIG. 5c, it is possible to attain a lever translating operation that the lever on the alignment chart is translated while being kept at the same inclination as each of the levers shown in FIGS. 5a-5b. Thus, the vehicle can be started or propelled by driving the wheels.

According to the present embodiment, when the driving achieved by only the power from motor generators MG1-MG2 is equivalent to driving started from a state of an output rotational speed of zero, before a driving force command is input, as seen in FIG. 5a, the two motor generators MG1-MG2 are rotated oppositely to each other by respective torques $\Delta T1$ and $\Delta T2$, while keeping the state of the output rotational speed of zero (i.e., No=0). Therefore, when the driving force command is generated or issued and then the corresponding motor generator torques T1 and T2 are generated, these motor generators MG1-MG2 are rotated oppositely to each other.

Therefore, there is no risk that an electric current flows through a biased phase of phases of each of motor generators MG1-MG2, and thus it is possible to avoid the problem that the electric current flows biasedly through a particular part of the motor-generator-drive control circuit provided to control the driving of each of the motor generators and as a result the heating value of the particular part becomes large. Additionally, it is possible to avoid the problem of a lack of output torque occurring owing to a limitation on the applied electric current to each of the motor generators.

Furthermore, after the driving force command has been input, the summed value of driving force command achievement torque T1 and lever correction torque $\Delta T1$ is set as target torque tT1 of motor generator MG1, whereas the summed value of driving force command achievement torque T2 and lever correction torque $\Delta T2$ is set as target torque tT2 of motor generator MG2. Thus, as can be seen from FIGS. 5b-5c, it is possible to initiate electric force transmission while keeping the inclined state of the lever shown in FIG. 5a, needed to achieve the previously-described operation and effects. There is no risk that motor generators MG1-MG2 are loaded at the initial stage of electric force transmission so that the rotational speeds of the motor generators become zero, and thus it is possible to more certainly achieve the previously-described operation and effects.

Next, the control program of FIG. 6 is explained hereunder. This control program is executed under a condition where the driving is started from the state of the output rotational speed of zero, but a small or middle amount of torque is required. The former-half condition (i.e., No=0) is similar to that of FIG. 4. However, the latter-half condition (i.e., the small or middle torque requirement) differs from the large torque requirement of FIG. 4.

At step S11, in the same manner as step S1 of FIG. 4 discussed above in reference to the alignment chart of FIG. 5a, calculated are lever correction torques $\Delta T1$ and $\Delta T2$ for motor generators MG1 and MG2, needed to provide a lever state that a rotational speed Ni of ring gear R1 serving as the input element is brought or adjusted to a predetermined normal-rotational speed Niref (e.g., 3 rad/sec in the shown embodiment), while keeping a standstill state of the output rotational speed of zero (i.e., No=0) and the output torque of zero (i.e., To=0).

Then, these lever correction torques $\Delta T1$ and $\Delta T2$ are output to motor controller 33 (see FIG. 3) as target torques tT1 and tT2 for motor generators MG1-MG2.

Figure 7A:
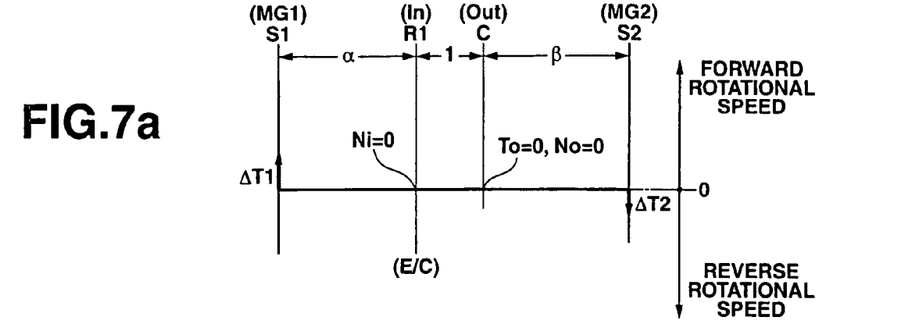
FIG. 7a is the alignment chart showing the lever state before starting the control program.
Figure 7B:
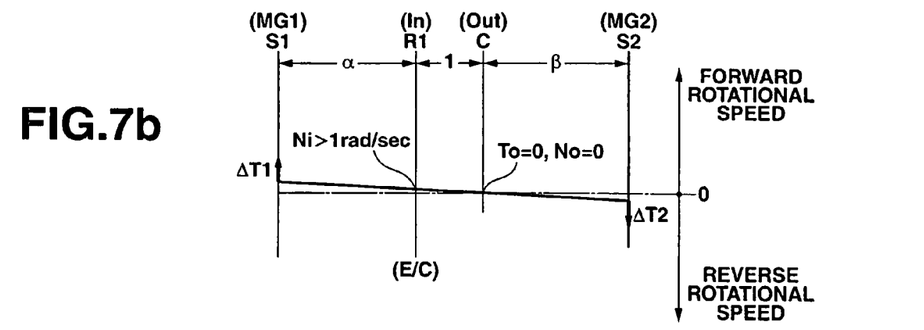
FIG. 7b is the alignment chart showing the lever state just after starting the control program.

Thus, as can be seen from FIG. 7a, lever correction torques $\Delta T1$ and $\Delta T2$ are applied to respective motor generators MG1-MG2. As shown in FIG. 7b, the lever on the alignment chart displaces with its rotary motion about the output Out, while keeping a standstill state of the output rotational speed of zero (i.e., No=0) and the output torque of zero (i.e., To=0).

As can be seen from FIG. 7b, after the lever has been brought to a lever state or an inclined state that rotational speed Ni of ring gear R1 serving as the input element has been adjusted to a set rotational speed (e.g., 1 rad/sec in the this embodiment) less than the predetermined normal-rotational speed Niref (3 rad/sec), the routine advances from step S12 to step S13, without returning to step S11.

At step S13, driving force command achievement torques T1 and T2 for motor generators MG1-MG2, needed to achieve a target torque tTo (a driving force command value) on the output Out, which target torque is determined based on accelerator opening APO and vehicle speed VSP, are calculated in the same manner as the arithmetic processing of step 3 of FIG. 4.

Thereafter, the summed value of driving force command achievement torque T1 and the previously-noted lever correction torque $\Delta T1$ is set as target torque tT1 of motor generator MG1, whereas the summed value of driving force command achievement torque T2 and the previously-noted lever correction torque $\Delta T2$ is set as target torque tT2 of motor generator MG2. These target torques, i.e., the summed values, are output into motor controller 33 (see FIG. 3).

Figure 7C:
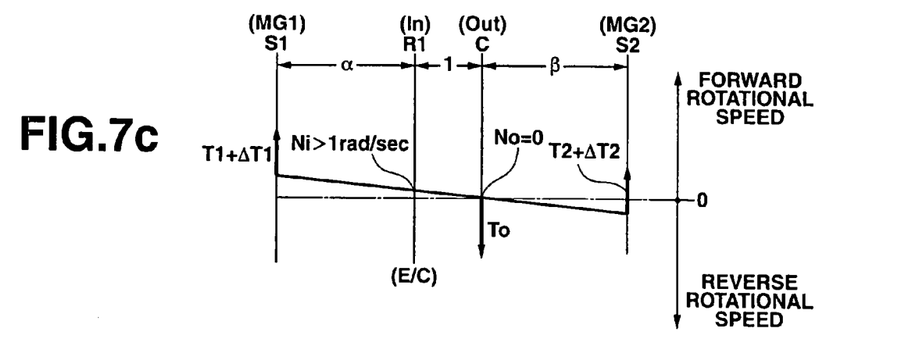
FIG. 7c is the alignment chart showing the lever state just before started with a driving force command input.

Thus, as shown in FIG. 7c, for the lever on the alignment chart, regarding both ends of the lever (that is, on motor generators MG1-MG2), the action of torques $\Delta T1$ and $\Delta T2$ shown in FIG. 7b is replaced by the action of torques $\Delta T1+T1$ and $\Delta T2+T2$ on the motor generators. Therefore, output torque To corresponding to target torque tTo is generated.

Figure 7D:
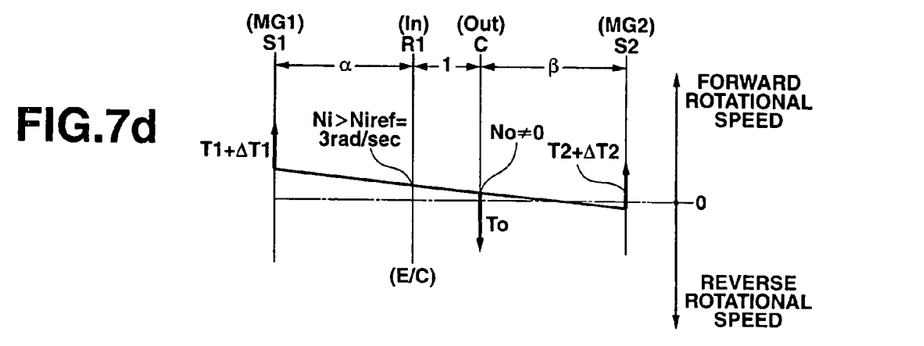
FIG. 7d is the alignment chart showing the lever state after started with the driving force command input.

As a result of this, at step S14, as shown in FIG. 7d, it is possible to attain a lever translating operation that the lever on the alignment chart is translated while being kept at the inclination that rotational speed Ni of ring gear R1 serving as the input element is brought or adjusted to predetermined normal-rotational speed Niref (3 rad/sec). Thus, the vehicle can be started or propelled by driving the wheels.

However, if a driving force command, created depending on accelerator opening APO, is input, target torque tTo (a driving force command value) on the output Out becomes "0" and thus driving force command achievement torques T1 and T2 of motor generators MG1-MG2 become "0". Therefore, target torques tT1 and tT2 for motor generators MG1-MG2 become respective lever correction torques ΔT1 and ΔT2, that is, tT1=ΔT1, tT2=ΔT2. And thus, the lever on the alignment chart is kept at the state as shown in FIG. 5a.

In the same manner as the first embodiment, in the second embodiment, when the driving achieved by only the power from motor generators MG1-MG2 is equivalent to driving started from a state of an output rotational speed of zero, before a driving force command is input, as can be seen in FIG. 5a, the two motor generators MG1-MG2 are rotated oppositely to each other by respective torques ΔT1 and ΔT2, while keeping the state of the output rotational speed of zero (i.e., No=0). Therefore, when the driving force command is generated and then the corresponding motor generator torques T1 and T2 are generated, these motor generators MG1-MG2 are rotated oppositely to each other.

Therefore, there is no risk that an electric current flows through a biased phase of phases of each of motor generators MG1-MG2, and thus it is possible to avoid the problem that the electric current flows biasedly through a particular part of the motor-generator-drive control circuit provided to control the driving of each of the motor generators and as a result the heating value of the particular part becomes large.

In particular, in the second embodiment, it is possible to suppress rotational speeds of motor generators MG1-MG2, produced before the driving force command is generated, at low values, and whereby an outputtable torque is limited but an electric power consumption rate can be suppressed at a low value.

When step S12 determines that the inequality of Ni>1 rad/sec is satisfied, the routine proceeds to step S13, at which the summed value of driving force command achievement torque T1 and lever correction torque ΔT1 is set as target torque tT1 of motor generator MG1, whereas the summed value of driving force command achievement torque T2 and lever correction torque ΔT2 is set as target torque tT2 of motor generator MG2.

Thus, after the driving force command has been input, driving force command achievement torques T1 and T2 do not become "0". Thus, as can be seen from FIG. 7d, it is possible to initiate electric force transmission while keeping the inclined state of the lever shown in FIG. 5a, needed to achieve the previously-described operation and effects. There is no risk that motor generators MG1-MG2 are loaded at the initial stage of electric force transmission so that the rotational speeds of the motor generators become zero, and thus it is possible to more certainly achieve the previously-described operation and effects.

In the shown embodiments, although the control program of FIG. 4 and the control program of FIG. 6 are explained as control routines separated from each other. It will be appreciated that these control routines may be combined with each other and executed as a single control program.

What is claimed is:

1. An electric force transmission device capable of transmitting a motor generator's driving force into drive shafts of a vehicle, comprising:
    a first motor generator;
    a second motor generator;
    an output shaft that outputs a driving force generated from the transmission device;
    a first rotating member coupled to the first motor generator;
    a second rotating member coupled to the second motor generator;
    a third rotating member coupled to the output shaft;
    a differential device having the first, the second, and the third rotating members and having two degrees of freedom that, when rotating states of two of the three rotating members are determined, a rotating state of the other is determined, and in which the third rotating member is laid out to be located between the first and the second rotating members on an alignment chart; and
    a controller configured to control the first motor generator and second motor generator such that, when a driving achieved by only power from the first motor generator and the second motor generator is equivalent to driving started from a state of an output rotational speed of zero, before the driving is started, the first motor generator and the second motor generator are rotated oppositely to each other, while keeping the state of the output rotational speed at zero.

2. The electric force transmission device as claimed in claim 1, further comprising:
    an engine; and
    a fourth rotating member coupled to the engine.

3. The electric force transmission device as claimed in claim 2, wherein:
    the controller is configured to control the motor generators such that, when the output shaft is driven from the stopped state of the rotational speed and in the presence of a large torque requirement, the motor generators are rotated oppositely to each other, while keeping the stopped state of the rotational speed of the output shaft, until a command regarding a driving force has been generated; and
    after the driving force command has been generated, a summed value of a motor generator torque of the first motor generator, needed to achieve a driving force command value, and a motor generator torque of the first motor generator, needed to rotate the motor generators oppositely to each other, and a summed value of a motor generator torque of the second motor generator, needed to achieve the driving force command value, and a motor generator torque of the second motor generator, needed to rotate the motor generators oppositely to each other, are commanded to the respective motor generators.

4. The electric force transmission device as claimed in claim 3, wherein:
    the controller is configured to determine that a condition of large torque requirement is satisfied, when a selected range mode is a sporty mode at which there is a tendency for a low-speed side transmission ratio to be selected, or when a state of charge of a battery for the motor generators is a large capacity of state of charge.

5. The electric force transmission device as claimed in claim 3, wherein:
    the controller is configured to determine a presence or absence of the driving force command, depending on whether a depressing operation of an accelerator pedal, which determines the driving force, is present or absent.

6. The electric force transmission device as claimed in claim 3, wherein:
    the controller is configured to determine the driving force command value based on an accelerator pedal's depression amount, which determines the driving force.

7. The electric force transmission device as claimed in claim 2, wherein:
    the controller is configured to control the motor generators such that, when the output shaft is driven from the stopped state of the rotational speed and in the presence of a small or middle torque requirement, the motor generators are rotated oppositely to each other, so that a rotational speed of the rotating member except the third rotating member related to the output shaft is adjusted to a predetermined rotational speed, while keeping the stopped state of the rotational speed of the output shaft; and after the rotational speed of the rotating member except the third rotating member related to the output shaft has exceeded a set rotational speed less than the predetermined rotational speed, a summed value of a motor generator torque of the first motor generator, needed to achieve a driving force command value, and a motor generator torque of the first motor generator, needed to rotate the motor generators oppositely to each other, and a summed value of a motor generator torque of the second motor generator, needed to achieve the driving force command value, and a motor generator torque of the second motor generator, needed to rotate the motor generators oppositely to each other, are commanded to the respective motor generators.

8. The electric force transmission device as claimed in claim 7, wherein:
the controller is configured to determine that a condition of small or middle torque requirement is satisfied, when a selected range mode is an economy mode at which there is a tendency for a high-speed side transmission ratio to be selected.

9. The electric force transmission device as claimed in claim 7, wherein:
the controller is configured to determine a presence or absence of the driving force command, depending on whether a depressing operation of an accelerator pedal, which determines the driving force, is present or absent.

10. The electric force transmission device as claimed in claim 7, wherein:
the controller is configured to determine the driving force command value based on an accelerator pedal's depression amount, which determines the driving force.

* * * * *